(12) United States Patent
Shoji et al.

(10) Patent No.: US 6,602,369 B2
(45) Date of Patent: Aug. 5, 2003

(54) PROCESS FOR PRODUCING LAMINATED SHEET COMPRISING ALUMINA FIBER PRECURSOR

(75) Inventors: Mamoru Shoji, Jyoetsu (JP); Norio Ikeda, Jyoetsu (JP); Toshiaki Sasaki, Jyoetsu (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 09/347,360

(22) Filed: Jul. 6, 1999

(65) Prior Publication Data

US 2003/0127175 A1 Jul. 10, 2003

(30) Foreign Application Priority Data

Jul. 7, 1998 (JP) .......................................... 10-191544

(51) Int. Cl.⁷ ................................................ B32B 5/02
(52) U.S. Cl. ................................. 156/89.11; 156/89.28; 156/204; 156/62.6; 264/627; 264/640; 264/681; 29/419.1
(58) Field of Search ................................ 156/62.6, 204, 156/461, 474, 89.11, 89.22, 89.28; 19/163; 270/40, 39.05; 428/114; 29/419.1, 428, 429, 430, 335, 819; 264/627, 640, 641, 681, 80, 172.19; 28/101, 102

(56) References Cited

U.S. PATENT DOCUMENTS

| 3,903,569 A | 9/1975 | Brandis ........................ 19/163 |
| 4,752,515 A | 6/1988 | Hosoi et al. ................. 428/114 |
| 4,766,649 A | 8/1988 | Rudt et al. ....................... 19/98 |
| 4,910,064 A * | 3/1990 | Sabee ........................... 428/113 |
| 5,286,182 A | 2/1994 | Maeda et al. ............... 425/72.1 |
| 5,301,399 A * | 4/1994 | Erhardt ......................... 28/102 |
| 5,454,145 A | 10/1995 | Wattel et al. .................. 19/163 |

FOREIGN PATENT DOCUMENTS

| CA | 499186 | * 1/1954 | ................ 156/62.6 |
| JP | 7-286514 | 10/1995 | |

OTHER PUBLICATIONS

Abstract of Japanese Patent Application No. 02 210051, Publication Date of Aug. 21, 1990.

* cited by examiner

Primary Examiner—Michael W. Ball
Assistant Examiner—Gladys Corcoran
(74) Attorney, Agent, or Firm—Edwards & Angell, LLP; David C. Conlin, Esq.; Richard J. Roos, Esq.

(57) ABSTRACT

The present invention relates to a process for producing a laminated sheet comprising an alumina fiber precursor, which process comprises spinning out an alumina fiber precursor from a solution mainly comprising an aluminum compound, falling and stacking said alumina fiber precursor on the surface of an accumulator to form a thin lamina sheet of alumina fiber precursor, continuously pulling out said lamina sheet from the accumulator, transferring the resultant lamina sheet to a folding device, and folding the sheet by a predetermined width while stacking the folded sheet and continuously moving the stacking sheet in the direction orthogonal to the folding direction.

7 Claims, 1 Drawing Sheet

FIXED

LEVEL MOVEMENT

PROCESS FOR PRODUCING LAMINATED SHEET COMPRISING ALUMINA FIBER PRECURSOR

BACKGROUND OF THE INVENTION

The present invention relates to a process for producing a laminated sheet comprising an alumina fiber precursor spun out from a spinning solution containing an aluminum compound. More particularly, it relates to a process for producing a laminated sheet comprising an alumina fiber precursor having a uniform basis weight throughout. Alumina fiber sheet obtained by calcining the said laminated sheet has excellent refractory and heat insulating properties as well as high mechanical strength and chemical stability even under high temperatures and are used as a high-temperature refractory/heat insulator, high-temperature cushioning medium and such.

It is known to produce alumina fiber by first forming an alumina fiber precursor by spinning from a spinning solution, and then calcining the said precursor. This method is especially suited for producing alumina fiber whose alumina content exceeds 65% by weight, such the production that the conventional melt fiber-forming method is inapplicable. The spinning solution used in this method is principally comprising an aluminum compound and contains small amounts of various adjuvants. The adjuvants include those which become the structural elements of the finally produced alumina fiber, such as metal compounds, and those which serve for adjusting the properties of the spinning solution, such as water-soluble polymeric compounds. For example, a spinning solution prepared by adding silica sol and polyvinyl alcohol to a basic aluminum chloride solution formed by dissolving aluminum in hydrochloric acid is used.

Blowing method and spindle method utilizing centrifugal force are known for spinning out an alumina fiber precursor from a spinning solution, but usually blowing method is used. According to this blowing method, the spinning solution is supplied into a high-speed spinning air stream from a nozzle, the supplied spinning solution being drawn out in the spinning air stream, deprived of moisture and solidified to form an alumina fiber precursor.

The thus formed alumina fiber precursor is amassed to form an alumina fiber precursor sheet having a specified basis weight, i.e., a specified weight per unit area. Although the constituent alumina fiber precursor has flexibility, the precursor sheet itself is low in fiber strength and also unstable as it contains structural water and/or additives in fiber, so that usually this precursor sheet, can not be offered as a commercial product in the form as it is. Therefore, it is necessary to calcine the alumina fiber precursor sheet to form an alumina fiber sheet having high crystallinity while maintaining a stable oxide state. It is also possible to obtain an alumina fiber sheet with even higher mechanical strength by needling the precursor sheet before calcining. (See U.S. Pat. Nos. 4,752,515, 4,931,239 and 5,104,713).

As means for producing an alumina fiber precursor sheet having a specified basis weight (fiber weight per unit area or basis area weight) by amassing the alumina fiber precursor, a method is known in which the alumina fiber precursor in the spinning air stream is fallen and stacked on an accumulator until a sheet with a specified basis weight is formed. For example, the alumina fiber precursor is fallen and stacked on a rotating endless belt, and the alumina fiber precursor sheet formed by stacking the said precursor is successively tugged out from the endless belt.

A method is also known in which the alumina fiber precursor carried in the spinning air stream is fallen and stacked on an accumulator to form a thin lamina sheet which is far smaller in thickness than the sheet to be formed having a specified basis weight, and this lamina sheet, in the next step, is wound round a number of times until forming the sheet with a specified basis weight. In a typical example of this method, a spinning air stream containing the alumina fiber precursor is let impinge almost at right angles against a rotating endless belt of the type which allows easy passage of air, such as a belt made of (metal) wire mesh (net). The spinning air stream is allowed to pass through the endless belt, but the alumina fiber precursor is caught and amassed on the endless belt to form a lamina sheet. This lamina sheet of alumina fiber precursor is pulled apart from the endless belt and wound around a rotator in whatever layers until forming a sheet having a specified basis weight. Then the roll of the laminated sheet on the rotator is cut into sections, and subjected to the ensuing steps such as calcining.

According to the above method, although capture and amassing of the alumina fiber precursor from the spinning air stream is easy, the sheet forming operations are complicated as they are batch type, and further, since the length of the sheet that can be treated depends on the circumferential length of the rotator, it is impossible to obtain sheets of all required lengths.

A further problem of the said conventional method is that the formed alumina fiber precursor sheet is non-uniform in basis weight along the width thereof, the basis weight being particularly small at both end portions of the sheet. This is for the reason that when the alumina fiber precursor is fallen from the spinning air stream and stacked on an accumulator, the precursor does not stack uniformly along the whole width of the accumulator, and most remarkably the stacking at both ends in the width direction is relatively small.

That the basis weight of the alumina fiber precursor sheet is non-uniform along the width thereof, particularly small at both ends, signifies corresponding variation of the basis weight of the calcined alumina fiber sheet in its width direction. An alumina fiber sheet as a commercial product is required to be uniform in basis weight in its entirety, so that both end portions in the width direction where the basis weight is smaller than the specified value must be cut out rather overly, which results in a reduced yield of the alumina fiber sheet. Also, even if both end portions are cut out, the sheet would have to be disposed off as a substandard product if there still exists a portion where the basis weight is outside the specified range.

In recent years, attention is focused on application of alumina fiber sheets to such areas as holding means for exhaust gas cleaning systems, heat-resistant filters and the like, and in such uses, higher precision of sheet thickness than in the conventional uses is required. For example, in the internal combustion engines, as a measure for disposal of exhaust gas, a cleaning system having a honeycomb catalyst housed in a casing is provided in the exhaust gas passage. For securely holding such honeycomb catalyst in the catalyst casing, it is necessary to wind a holding mat for catalyst holding member around the honeycomb catalyst to as much a uniform thickness as possible and house this catalyst in the casing so that it will be closely secured to the inside wall of the casing by the restoring force of the holding member. Such a holding member is preferably a fiber sheet which is proof against fiber deterioration and capable of maintaining an appropriate surface pressure even under high temperatures. Japanese Patent Application Laid-Open (KOKAI) No. 7-286514, for instance, teaches that among alumina fiber sheets, the one produced by laminating alumina fiber having a composition of $Al_2O_3:SiO_2=70–74:30–26$ (by weight) and needling the laminate is especially preferred.

As a result of the present inventors' earnest studies to solve the above problem, it has been found that by folding the thin lamina sheet of alumina fiber precursor by a predetermined width while stacking the folded sheet and continuously moving the stacking sheet in the direction orthogonal to the folding direction, the obtained alumina fiber precursor sheet has uniform basis weight along the full width thereof.

The present invention has been attained on the basis of the above finding.

SUMMARY OF THE INVENTION

An object of the present invention is to provide a process for producing an alumina fiber precursor sheet which is uniform in basis weight along the full width thereof.

To attain the above aim, in the first aspect of the present invention, there is provided a process for producing a laminated sheet comprising an alumina fiber precursor, which process comprises spinning out an alumina fiber precursor from a solution mainly comprising an aluminum compound, falling and stacking said alumina fiber precursor on the surface of an accumulator to form a thin lamina sheet of alumina fiber precursor, continuously pulling out said lamina sheet from the accumulator, transferring the resultant lamina sheet to a folding device, and folding the sheet by a predetermined width while stacking the folded sheet and continuously moving the stacking sheet in the direction orthogonal to the folding direction.

In the second aspect of the present invention, there is provided a process for producing an alumina fiber sheet which comprises calcining a laminated sheet of alumina fiber precursor obtained from a process according to the first aspect.

In the third aspect of the present invention, there is provided a holding mat for catalyst holding member, which comprises an alumina fiber sheet produced by needling and calcining a laminated sheet of alumina fiber precursor obtained from a process comprising spinning out an alumina fiber precursor from a solution mainly comprising an aluminum compound, falling and stacking said alumina fiber precursor on the surface of an accumulator to form a thin lamina sheet of alumina fiber precursor, continuously pulling out said lamina sheet from the accumulator, transferring the resultant lamina sheet to a folding device, and folding the sheet by a predetermined width while stacking the folded sheet and continuously moving the stacking sheet in the direction orthogonal to the folding direction.

DETAILED DESCRIPTION OF THE INVENTION

Figure 1:
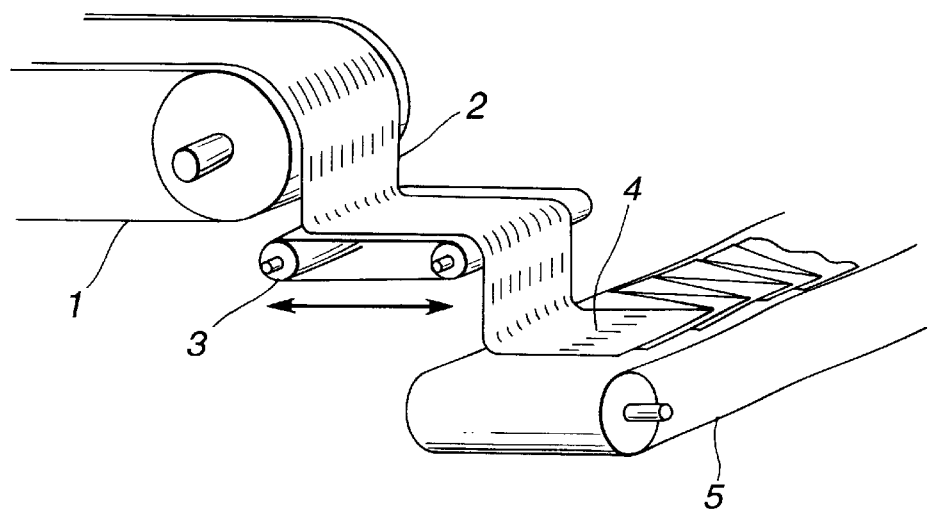
FIG. 1 is a schematic flow sheet illustrating an embodiment of the present invention.

The present invention is described in detail below.

In the present invention, preparation of the spinning solution and formation of the alumina fiber precursor can be accomplished according to the conventional methods. For example, the spinning solution can be prepared by forming a basic aluminum chloride solution by dissolving aluminum in hydrochloric acid, and adding silica sol to the solution so that the finally obtained alumina fiber will have a composition of $Al_2O_3:SiO_2$=preferably 65~98:35~2, more preferably 70~97:35~3 (by weight). When the silicon content increases excessively, although it becomes easy to form fibers, heat resistance lowers excessively, while a too small silicon content make the fibers fragile. In order to improve spinnable properties, it is preferable to add a water-soluble organic polymer such as polyvinyl alcohol, polyethylene glycol, starch, cellulose derivatives or the like. In some cases, the solution is properly concentrated to adjust the viscosity usually to 10 to 100 poise.

Blowing method, in which the spinning solution is supplied into a high-speed spinning air stream, is preferably used for forming alumina fiber precursor from the spinning solution. The nozzles usable in the blowing method include two types: in one type, a spinning solution nozzle is provided in an air stream nozzle which generates a spinning air stream; in the other type, a spinning solution nozzle is provided so as to supply the spinning solution externally to the spinning air stream. Both types can be used in the present invention. In case where spinning is carried out according to the said blowing method, preferably an endless belt made of metal gauze is set substantially at right angles against the spinning air stream, and the spinning air stream containing the formed alumina fiber precursor is let impinge against the rotating belt. The alumina fiber precursor formed by the said spinning is usually about several micrometers ($\mu$m) in diameter and several ten to several hundred mm in length.

The thin lamina sheet of alumina fiber precursor formed on the accumulator is successively pulled out from the accumulator and transferred to a folder by which the sheet is folded to a predetermined width and amassed, and the amassed sheet is continuously moved in the direction orthogonal to the folding direction. In other words, the lamina sheet is successively pulled apart from the accumulator, folded and stacked in the advancing direction of the sheet, and continuously moved transversely to the folding direction. Therefore, the folded sheet width becomes equal to the width of the laminated sheet to be formed. Thereby both end portions in the width direction of the lamina sheet are dispersed in the formed laminated sheet, so that the basis weight of the laminated sheet becomes uniform throughout the sheet.

The basis weight of the lamina sheet should at least be enough to form a thinnest allowable sheet; it is usually 10 to 200 g/m$^2$, preferably 30 to 100 g/m$^2$. This thin lamina sheet is not necessarily uniform in both of its crosswise and longitudinal directions, so that the laminated sheet is formed by laminating the lamina sheet in at least 5 layers, preferably 8 or more layers, more preferably 10 to 80 layers. By this lamination, local non-uniformity of the lamina sheet is countervailed, so that it is possible to obtain a laminated sheet having a uniform basis weight throughout. The number of laminations is not specifically limited, but it is to be noted that a too large thickness of the sheet may make it unable to obtain preferred improvement of peel strength in the thickness direction by needling normally conducted in a later step, or may cause a reduction of sheet productivity.

For forming the laminated sheet, the lamina sheet is delivered out continuously from the accumulator and transferred to a folder whereby the sheet is folded to a predetermined width, stacked and continuously moved in the direction orthogonal to the folding direction. For example, in the accumulator, alumina fiber precursor is stacked on a metal gauze-like rotating endless belt to form a thin lamina sheet, and this sheet is separated from the endless belt and forwarded to the folder. In this folder, the sheet is folded to a predetermined width and piled up on an endless belt rotating in the direction substantially orthogonal to the folding direction. The number of laminations of the laminated sheet depends on the moving speed of the endless belt. Slow speed increases the number of laminations, while fast speed decreases the number of laminations.

FIG. 1 is a schematic flow sheet illustrating an embodiment of the present invention. In this embodiment, there is used a folding system 3 comprising an endless belt 1 for carrying the lamina sheet 2, another endless belt 5 for carrying the laminated sheet, said endless belt 5 being disposed at a position lower than the endless belt 1 and in the direction transverse thereto, and a folding means by which the lamina sheet hanging from the rear end of the endless belt 1 is folded and stacked on the endless belt 5. In this folding system 3, the folding means is arranged movable laterally, and the width of the laminated sheet is decided by the range of travel of the folding means. Use of such folding system makes it possible to continuously produce a laminated sheet 4 of any optional width from the continuously transferred thin lamina sheet.

Figure 2:
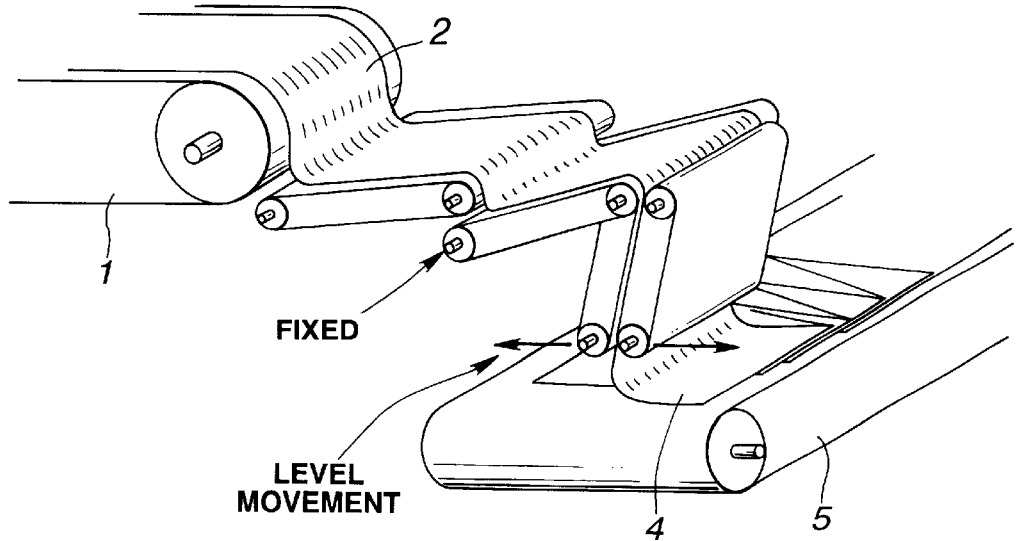
FIG. 2 is a schematic illustration of a folder system usable in carrying out the present invention.

The folding system usable in the present invention is not limited to the structure illustrated in FIG. 1; it is possible to use a vertical folding system such as illustrated in FIG. 2.

The thus produced laminated sheet of alumina fiber precursor is then calcined by a conventional method and thereby made into an alumina fiber sheet. Calcining is carried out usually at a temperature not lower than 500° C., preferably 1,000 to 1,300° C. When the laminated sheet is subjected to needling before calcining, it is possible to obtain an alumina fiber sheet with high mechanical strength in which the alumina fibers are also oriented in the thickness direction. Needling is conducted usually at a rate of 1 to 50 stitches/cm$^2$. Generally, the higher the needling rate is, the higher become the bulk density and peel strength of the obtained alumina fiber sheet.

According to the present invention, it is possible to produce a laminated sheet of alumina fiber precursor having a uniform basis weight throughout. By calcining this laminated sheet by a conventional method after needling, if necessary, there can be obtained an alumina fiber sheet having a uniform basis weight throughout. Further, the present invention enables continuous production of alumina fiber sheet of any optional length with ease and can remarkably improve production efficiency over the conventional methods.

EXAMPLES

The present invention is described in further detail by showing the examples thereof, which examples however are merely intended to be illustrative and not to be construed as limiting the scope of the invention.

Example 1

To an aqueous solution of basic aluminum chloride (aluminum content: 70 g/l, Al/Cl=1.8 (atomic ratio)) was added silica sol so that the finally obtained alumina fibers would have a composition of $Al_2O_3:SiO_2=72:28$ (by weight). After further adding polyvinyl alcohol, the mixed solution was concentrated to prepare a spinning solution having a viscosity of 40 poises and an alumina/silica content of about 30% by weight, and spinning thereof was carried out with this spinning solution according to the blowing method. A spinning air stream carrying the thus formed alumina fiber precursor was let impinge against a metal gauze-made endless belt, thereby capturing and amassing the alumina fiber precursor to obtain a 1,050 mm wide thin sheet thereof with a basis weight of 40 g/m$^2$, which was relatively non-uniform and had the alumina fiber precursor arranged randomly in the plane.

This thin sheet of alumina fiber precursor was folded and stacked using a folding device of a structure shown in FIG. 1 to produce a continuous 950 mm wide laminated sheet of alumina fiber precursor comprising 63 layers of folded lamina sheet. This laminated sheet was calcined by first placing it under 300° C. for 2 hours, then successively raising the temperature to 300~550° C. at a rate of 2° C./min and then to 550~1,250° C. at a rate of 5° C./min, and finally leaving it under 1,250° C. for 30 minutes to make a continuous alumina fiber sheet measuring about 25 mm in thickness and about 650 mm in width. This alumina fiber sheet was cut to a width of 600 mm and both end portions comprising the turnups were removed. A 2,000 mm portion of this alumina fiber sheet was divided into 6 equal sections in the width direction and into 20 equal sections in the longitudinal direction, and the basis weight of each section was measured. The mean value of basis weight in the width direction of the longitudinally eicosasected sections and the tripled value (3σ/mean value of basis weight×100; %) of its standard deviation were determined. The scatter determined by averaging the determinations in the longitudinal direction (n=20) was 7.7%.

COMPARATIVE EXAMPLE 1

A thin lamina sheet obtained according to the same procedure as in Example 1 was wound around a round rotator to produce a 1,050 mm wide laminated sheet of alumina fiber precursor comprising 63 layers of the lamina sheet, and this laminated sheet was calcined to obtain an approximately 40 mm thick and approximately 740 mm width alumina fiber sheet. This alumina fiber sheet was cut to a width of 600 mm and subjected to the same test as said above. The scatter determined in the same way as in Example 1 was 17.4%.

Example 2

A thin lamina sheet with a basis weight of 40 g/m$^2$ and a width of 1,050 mm obtained in the same way as in Example 1 was folded, stacked and separated at a higher rate than in Example 1 to produce a 950 mm wide continuous laminated sheet of alumina fiber precursor comprising 30 layers of the lamina sheet. To this laminated sheet was sprayed 30 ml/kg of a 10 wt % higher fatty acid ester/mineral oil solution as a lubricant, after which the sheet was subjected to needling at a rate of 5 stitches/cm$^2$ and then calcined in the same way as in Example 1 to make a continuous alumina fiber sheet having a thickness of about 10 mm and a width of 650 mm. Evaluations of this alumina fiber sheet by the same method as used in Example 1 showed a scatter of 6.7%.

In order to evaluate suitability of the obtained alumina fiber sheet for use as a holder for exhaust gas cleaning systems, five 50 mm×50 mm square test pieces were collected from the sheet by cutting it in the width direction at equal intervals, and each test piece was subjected to 5-time repetition of a compression/release operation which comprised compressing the test piece to a thickness of 4 mm at room temperature by a compression tester, measuring the surface pressure and then releasing the compression. Each test piece was also subjected to 5-time repetition of a compression/release operation which comprised compressing the test piece to a thickness of 3 mm, measuring the surface pressure and releasing the compression. The results of the above evaluation tests are shown in Table 1.

COMPARATIVE EXAMPLE 2

A thin lamina sheet obtained in the same way as in Comparative Example 1 was wound around a round rotator to produce a 1,050 mm wide laminated sheet of alumina fiber precursor comprising 30 layers of the said lamina sheet, and this laminated sheet was needled and calcined as in Example 1 to obtain an alumina fiber sheet having a thickness of about 10 mm and a width of about 740 mm. The scatter of this alumina fiber sheet as determined in the same way as described above was 16.8%.

Suitability of the obtained alumina fiber sheet for use as a holder for exhaust gas cleaning systems was evaluated in the same way as in Example 2, the results are shown in Table 1. Comparing Example 2 and Comparative Example 2, both are high in surface pressure, which is little reduced even if thickness alteration is repeated, and both are also high in restorative force of fibers and suited for use as a holder. However, it is remarkable that Example 2 is small in scatter of surface pressure properties between the sheets than Comparative Example 2, and particularly suited for use as a holder material.

TABLE 1

|  | Example 2 | | Comp. Example 2 | |
| --- | --- | --- | --- | --- |
|  | Compression thickness | | | |
|  | 4 mm | 3 mm | 4 mm | 3 mm |
| Surface pressure (after 1st/5th application of compression, kg/cm$^2$) | | | | |
| Test piece 1 | 1.5/1.3 | 3.9/3.8 | 1.0/1.0 | 2.8/2.8 |
| Test piece 2 | 1.4/1.3 | 3.7/3.7 | 1.6/1.5 | 3.9/3.8 |
| Test piece 3 | 1.6/1.5 | 4.0/3.9 | 1.1/1.0 | 2.9/2.8 |
| Test piece 4 | 1.5/1.4 | 3.8/3.7 | 1.7/1.5 | 4.3/4.1 |
| Test piece 5 | 1.6/1.5 | 4.1/4.0 | 2.5/2.1 | 5.2/4.7 |

What is claimed is:

1. A process for producing a laminated sheet, which process comprises:

spinning out an alumina fiber precursor from a solution mainly comprising an alumina compound, falling and stacking said alumina fiber precursor on the surface of an accumulator to form a thin lamina sheet of alumina fiber precursor, continuously pulling out said lamina sheet from the accumulator, transferring the resultant lamina sheet to a folding device, folding the lamina sheet by a predetermined width while stacking the folded sheet and continuously moving the stacked sheet in a direction orthogonal to a folding direction to form a laminated sheet, and calcining the laminated sheet of alumina fiber precursor.

2. A process according to claim 1, wherein the alumina fiber precursor spun out from a solution mainly comprising an aluminum compound is fallen and stacked on a rotating endless belt of the accumulator to form a thin lamina sheet of alumina fiber precursor, and said lamina sheet is pulled out from the endless belt of the accumulator and transferred to the folding device, and the lamina sheet is folded by a predetermined width while stacking said folded sheet on an endless belt rotating in a direction orthogonal to a folding direction.

3. A process according to claim 1, wherein the lamina sheet has a basis weight of 10 to 200 g/m$^2$.

4. A process according to claim 1, wherein the laminated sheet comprises not less than 8 layers of lamina sheet.

5. A process according to claim 1, wherein the laminated sheet is calcined after needling.

6. The process according to claim 1, wherein the laminated sheet has a scatter value of between about 6.7% and about 7.7%.

7. The process according to claim 1, wherein the laminated sheet exhibits a substantially constant pressure in response to a plurality of compression/release operations performed upon the laminated sheet.

\* \* \* \* \*